United States Patent
Rumpf

(10) Patent No.: US 10,666,802 B2
(45) Date of Patent: May 26, 2020

(54) TECHNOLOGIES FOR SCALING CALL CENTER SUPPORT STAFF

(71) Applicant: Interactive Intelligence Group, Inc., Indianapolis, IN (US)

(72) Inventor: Christopher Rumpf, Durham, NC (US)

(*) Notice: Subject to any disclaimer, the term of this patent is extended or adjusted under 35 U.S.C. 154(b) by 109 days.

(21) Appl. No.: 15/634,518

(22) Filed: Jun. 27, 2017

(65) Prior Publication Data
US 2017/0374197 A1 Dec. 28, 2017

Related U.S. Application Data

(60) Provisional application No. 62/354,885, filed on Jun. 27, 2016.

(51) Int. Cl.
*H04M 3/00* (2006.01)
*H04M 3/51* (2006.01)
*H04M 3/36* (2006.01)

(52) U.S. Cl.
CPC .......... *H04M 3/5125* (2013.01); *H04M 3/36* (2013.01); *H04M 3/5175* (2013.01); *H04M 2203/402* (2013.01)

(58) Field of Classification Search
CPC . H04M 3/5125; H04M 3/36; H04M 2203/402
USPC ....... 379/265.01–265.14, 266.01–266.1, 309
See application file for complete search history.

(56) References Cited

U.S. PATENT DOCUMENTS

| | | | | |
|---|---|---|---|---|
| 4,510,351 A | * | 4/1985 | Costello | H04M 3/51 379/112.01 |
| 5,778,060 A | * | 7/1998 | Otto | H04M 3/5125 379/265.04 |
| 6,282,282 B1 | * | 8/2001 | Wineberg | H04M 3/5158 379/265.02 |
| 6,614,903 B1 | * | 9/2003 | Flockhart | G06Q 10/06 379/265.06 |
| 7,043,007 B2 | * | 5/2006 | McPartlan | H04M 3/5232 379/219 |
| 9,955,011 B1 | * | 4/2018 | Billman | H04M 3/523 |
| 2002/0181692 A1 | * | 12/2002 | Flockhart | H04M 3/51 379/265.02 |
| 2003/0165223 A1 | * | 9/2003 | Timmins | G06Q 10/02 379/207.02 |

(Continued)

*Primary Examiner* — William J Deane, Jr.

(57) ABSTRACT

Technologies for scaling call center support staff include one or more local agent computing devices of a call center that includes an interaction management computing device communicatively coupled to one or more customer computing devices and one or more remote agent computing devices. The interaction management computing device is configured to receive inbound service calls and insert them into a respective service queue. The interaction management computing device is additionally configured to determine whether a service queue response threshold associated with the service queue has been violated as a function of each service call having been inserted into the service queue, identify, in response to a determination that the service queue response threshold associated with the service queue has been violated, one or more remote agents from a queue of available remote agents, and add the identified one or more remote agents to an agent pool associated with the service queue. Additional embodiments are described herein.

14 Claims, 4 Drawing Sheets

(56) References Cited

U.S. PATENT DOCUMENTS

| | | | | |
|---|---|---|---|---|
| 2004/0028211 A1* | 2/2004 | Culp | ........................ | H04M 3/36 |
| | | | | 379/265.01 |
| 2005/0183084 A1* | 8/2005 | Cuomo | ................... | G06F 9/505 |
| | | | | 718/100 |
| 2007/0230681 A1* | 10/2007 | Boyer | ................. | G06Q 30/016 |
| | | | | 379/265.1 |
| 2008/0222004 A1* | 9/2008 | Pollock | .............. | G06Q 30/0603 |
| | | | | 705/15 |
| 2009/0030848 A1* | 1/2009 | Wendel | .............. | G06Q 10/0637 |
| | | | | 705/80 |
| 2014/0205079 A1* | 7/2014 | Griffin | ................ | H04M 3/5238 |
| | | | | 379/265.12 |
| 2014/0270136 A1* | 9/2014 | Thomson | ................ | H04M 3/51 |
| | | | | 379/265.03 |
| 2017/0097971 A1* | 4/2017 | Brown | .................... | G06F 16/26 |
| 2018/0262616 A1* | 9/2018 | Patel | ..................... | H04L 51/066 |

* cited by examiner

TECHNOLOGIES FOR SCALING CALL CENTER SUPPORT STAFF

CROSS REFERENCE TO RELATED APPLICATIONS

The present application is related to, and claims the priority benefit of, U.S. Provisional Patent Application Ser. No. 62/354,885 filed Jun. 27, 2016, the contents of which are hereby incorporated in their entirety into the present disclosure.

BACKGROUND OF THE DISCLOSED EMBODIMENTS

Nearly every goods and services provider offers some degree of support to those customers who buy or user their products and/or services. Support can come in many forms using various mediums, such as a phone call, video chat, email, a messenger service, etc. Having a respectable customer support system can play an integral role in building/maintaining a company's brand. As such, companies often go to great lengths to ensure their customer's support needs are met. To meet those support needs, companies employ any number of customer service agents. Oftentimes, the customer service agents are assigned to a physical cubicle at a co-location center and work a set schedule.

However, such work accommodations are not likely to be scalable. In other words, the support staff is not dynamic such that it can be scaled based on demand. Presently, in order to deal with such changes, management has to make a judgment call as to how to handle the work flow. For example, agents may be released before their shift ends if call volume is too low, they may be asked to work past their shift if call volume is too high, they can be called in to work on an off-day, etc. Unfortunately, such decisions can have serious consequences. For example, if call volume is slow, resulting in the call center being overstaffed, one or more agents is likely to be sent home. However, it is reasonable to expect that call volumes can increase/decrease unexpectedly at any given time. Under such conditions, call volume can exceed support capacity, in which case the customer service responsiveness is negatively impacted. Such consequences can result in tarnishing the company's brand or worse, depending on the support services being provided. Accordingly, there exists a need for improvements in technologies for call center scalability.

SUMMARY OF THE DISCLOSED EMBODIMENTS

In one aspect, a method for scaling call center support staff includes receiving, by a call center management computing device, a service call; inserting, by the call center management computing device, the service call into a service queue; determining, by the call center management computing device, whether a service queue response threshold associated with the service queue has been violated as a function of the service call having been inserted into the service queue; identifying, by the call center management computing device and in response to a determination that the service queue response threshold associated with the service queue has been violated, one or more remote agents from a queue of available remote agents; and adding, by the call center management computing device, the identified one or more remote agents to an agent pool associated with the service queue.

In some embodiments, determining whether the service queue response threshold associated with the service queue has been violated comprises determining whether a present call volume of the service queue exceeds a call volume threshold of the service queue. In other embodiments, determining whether the service queue response threshold associated with the service queue has been violated comprises determining whether an average hold time of service calls in the service queue exceeds a wait time threshold.

In some embodiments, adding the identified one or more remote agents to the agent pool includes transmitting a notification to each of the identified one or more remote agents, wherein the notification identifies to the respective identified one or more remote agents the activation to the agent pool; receiving an indication from each of the identified one or more remote agents that indicates the corresponding remote agent is ready to be added to the agent pool; and inserting, upon receiving the respective indication, the associated identified one or more remote agents into the agent pool associated with the service queue.

In some embodiments, identifying, by the call center management computing device, one or more metrics of the service queue; comparing, by the call center management computing device, the identified one or more metrics of the service queue to a corresponding service queue response threshold associated with the service queue; determining, by the call center management computing device, whether the service queue response threshold associated with the service queue has been violated as a function of the comparison; identifying, by the call center management computing device and in response to a determination that at least one service queue response threshold associated with the service queue has been violated, one or more remote agents to remove from the agent pool; and removing, by the call center management computing device, the identified one or more remote agents from the agent pool.

In some embodiments, the method further includes adding, by the call center management computing device, the deactivated remote agents to the queue of available remote agents. In other embodiments, the method additionally includes transmitting, by the call center management computing device, a removal notification to each of the deactivated remote agents notifying each of the deactivated remote agents of removal from the agent pool.

In another aspect, an interaction management computing device for scaling call center support staff includes one or more computer-readable medium comprising instructions; and one or more processors coupled with the one or more computer-readable medium and configured to execute the instructions to receive a service call; insert the service call into a service queue; determine whether a service queue response threshold associated with the service queue has been violated as a function of the service call having been inserted into the service queue; identify, in response to a determination that the service queue response threshold associated with the service queue has been violated, one or more remote agents from a queue of available remote agents; and add the identified one or more remote agents to an agent pool associated with the service queue.

In some embodiments, to determine whether the service queue response threshold associated with the service queue has been violated comprises to determine whether a present call volume of the service queue exceeds a call volume threshold of the service queue. In other embodiments, to determine whether the service queue response threshold associated with the service queue has been violated comprises to determine whether an average hold time of service calls in the service queue exceeds a wait time threshold.

In some embodiments, adding the identified one or more remote agents to the agent pool comprises to transmit a notification to each of the identified one or more remote agents, wherein the notification identifies to the respective identified one or more remote agents the activation to the agent pool; receive an indication from each of the identified one or more remote agents that indicates the corresponding remote agent is ready to be added to the agent pool; and insert, upon having received the respective indication, the associated identified one or more remote agents into the agent pool associated with the service queue.

In some embodiments, the one or more processors are further configured to execute the instructions to identify one or more metrics of the service queue; compare the identified one or more metrics of the service queue to a corresponding service queue response threshold associated with the service queue; determine whether the service queue response threshold associated with the service queue has been violated as a function of the comparison; identify, in response to a determination that at least one service queue response threshold associated with the service queue has been violated, one or more remote agents to remove from the agent pool; and remove the identified one or more remote agents from the agent pool.

In some embodiments, the one or more processors are further configured to execute the instructions to add the deactivated remote agents to the queue of available remote agents. In other embodiments, the one or more processors are further configured to execute the instructions to transmit a removal notification to each of the deactivated remote agents notifying each of the deactivated remote agents of removal from the agent pool.

BRIEF DESCRIPTION OF DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
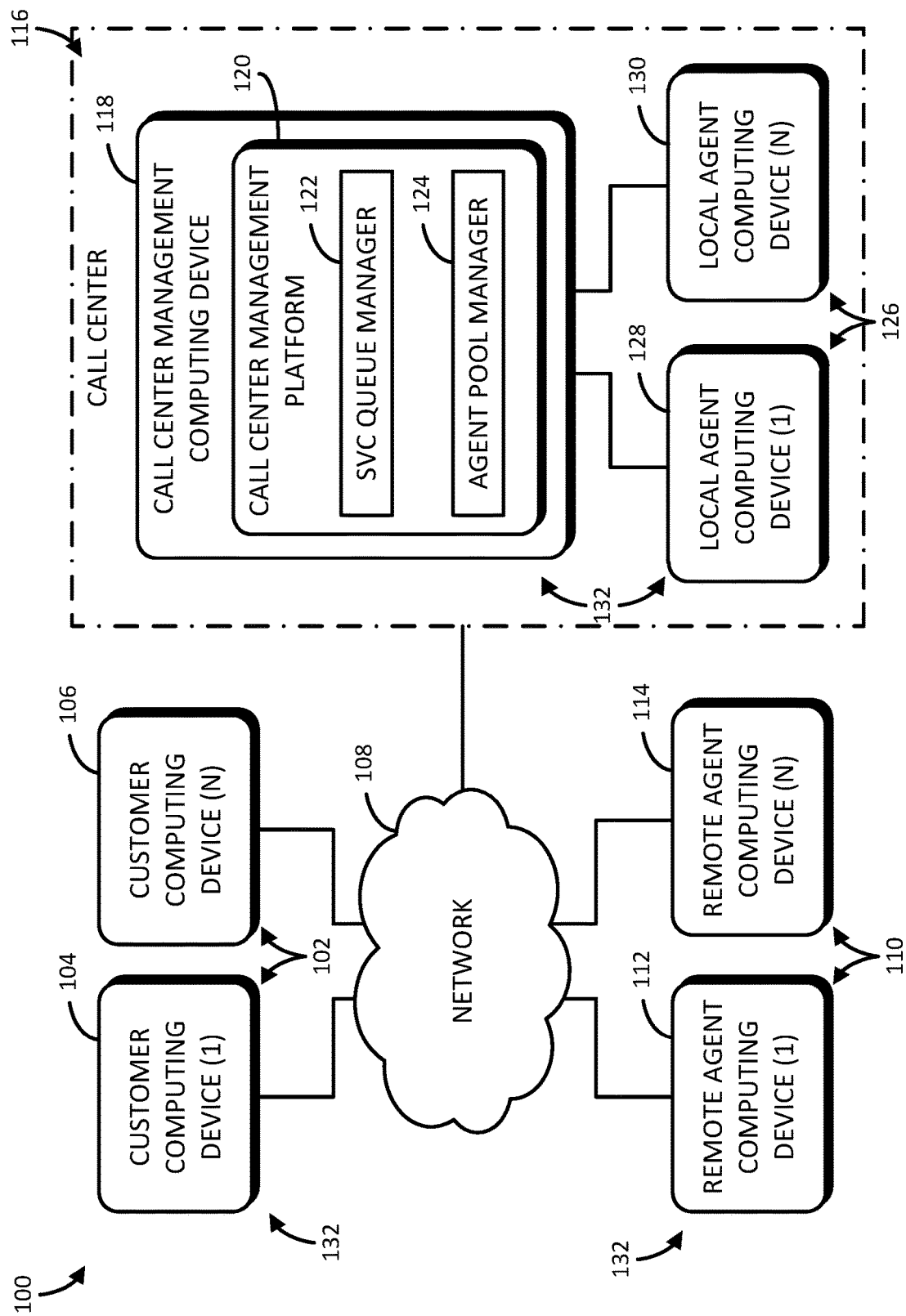
FIG. 1 is a simplified block diagram of at least one embodiment of a system for scaling call center support staff that includes one or more remote agent computing devices and a call center with one or more local agent computing devices.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 is an illustrative system 100 for scaling call center support staff that includes one or more customer computing devices 102 and one or more remote agent computing devices 110 communicatively coupled to a call center 116 via a network 108. The illustrative call center 116 includes a call center management computing device 118 which is configured to receive inbound support call traffic and route the support call traffic to customer service agents. The customer service agents may be local to the call center 116 (e.g., operating via a local agent computing device 126 of the call center 116) or remote of the call center 116 (e.g., operating via a remote agent computing device 110).

In use, as described in further detail below, the call center management computing device 118 is configured to manage the interaction between customers and agents. In an illustrative example, a customer interested in speaking to an agent of a good and/or service provider (e.g., a customer service representative) contacts the provider's service/support line (e.g., via a respective one of the customer computing devices 102). The call center management computing device 118 receives the call and places the call into a service queue. Additionally, the call center management computing device 118 analyzes the service queue to determine whether an agent pool (i.e., a number of agents presently serving or available to service the service queue) is sufficient to handle the present call volume of the service queue. To do so, the call center management computing device 118 may be configured to, for example, compare a number of callers in the service queue against a call volume threshold (i.e., a threshold number of callers) of the service queue, compare an average wait time against a wait time threshold (i.e., a maximum acceptable amount of time a caller should be kept on hold before speaking to an agent) of the service queue, and/or any other characteristic of the service queue and/or the callers queued therein.

Accordingly, based on the analysis, the call center management computing device 118 is configured to either adjust the agent pool or leave it as is. However, unlike call centers in which the agents are local to the call center (i.e., the agents assisting callers which are located in the call center 116 via a respective local agent computing device 126), the call center management computing device 118 is configured to adjust a number of remote agents (i.e., agents assisting callers via a respective remote agent computing device 110) assigned to the service queue. In other words, the call center management computing device 118 is configured to determine a number of remote agents to activate (i.e., add to the agent pool) or deactivate (i.e., remote from the agent pool), as a function of the analysis. It should be appreciated that, in some embodiments, a minority, a majority, or all of the agents may be remote agents.

The illustrative customer computing devices 102 includes a first customer computing device 102, designated as customer computing device (1) 104, and an "Nth" customer computing device 102, designated as customer computing device (N) 106. It should be appreciated that the Nth customer computing device 102 (i.e., customer computing device (N) 108) represents "N" additional customer computing device(s) 102, wherein "N" is a positive integer value. Similarly, the illustrative remote agent computing devices 110 includes a first remote agent computing device 110, designated as remote agent computing device (1) 112, and an "Nth" remote agent computing device 110, designated as remote agent computing device (N) 114. It should be similarly appreciated that the Nth remote agent computing device 110 (i.e., remote agent computing device (N) 114) represents "N" additional remote agent computing device(s) 110, wherein "N" is a positive integer value. Additionally, the illustrative local agent computing devices 126 includes a first local agent computing device 126, designated as local agent computing device (1) 128, and an "Nth" local agent computing device 126, designated as local agent computing device (N) 130. It should be further appreciated that the Nth local agent computing device 130 (i.e., local agent computing device (N) 130) represents "N" additional local agent computing device(s) 126, wherein "N" is a positive integer value.

The customer computing devices 102, the remote agent computing devices 110, and the local agent computing devices 126, as well as the call center management computing device 118, may each be embodied as any type of computing device 132 capable of performing the respective functions described herein. For example, in some embodiments, one or more of the customer computing devices 102, the remote agent computing devices 106, and/or the local agent computing devices 126 may be embodied as desktop computers or mobile computing devices (e.g., a smartphone, a wearable, a tablet, a laptop, a notebook, etc.). In some embodiments, the call center management computing device 118 may be embodied as one or more servers (e.g., stand-alone, rack-mounted, etc.), compute devices, storage devices, and/or combination of compute blades and data storage devices (e.g., of a storage area network (SAN)) in a cloud architected network or data center.

It should be appreciated that, in some embodiments, the customer computing devices 102, the remote agent computing device 110, the call center management computing device 118, and/or the local agent computing devices 126 may include more than one computing device 132 (e.g., in a distributed computing architecture), each of which may be usable to perform at least a portion of the functions described herein of the respective computing device 132. In other words, in some embodiments, one or more functions of the call center management computing device 118 may be executed on one or more computing devices 132, while one or more same, additional, or alternative functions of the call center management computing device 118 may be executed on one or more other computing devices 132.

Figure 2:
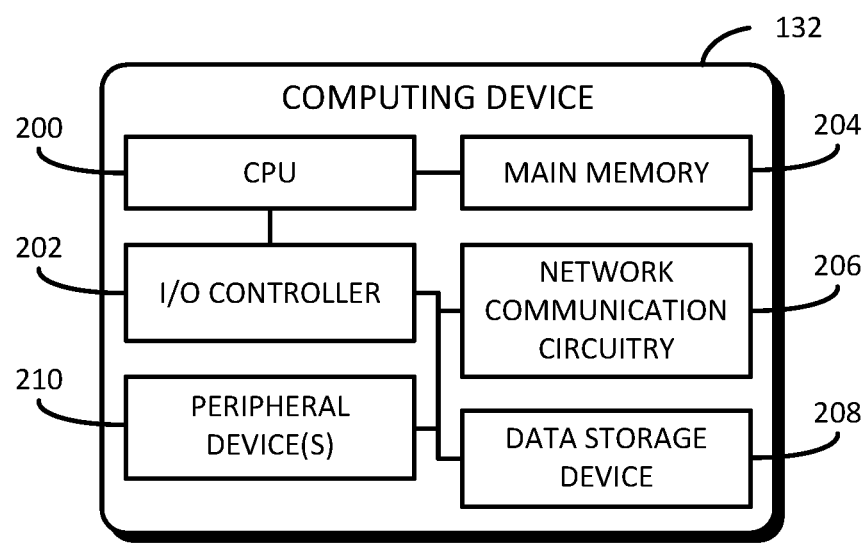
FIG. 2 is a simplified block diagram of at least one embodiment of the computing devices of the system of FIG. 1.

Referring now to FIG. 2, an illustrative computing device 132 (e.g., an illustrative one of the customer computing devices 102, an illustrative one of the remote agent computing devices 110, the call center management computing device 118, and/or an illustrative one of the remote agent computing devices 126) includes a central processing unit (CPU) 200, an input/output (I/O) controller 202, a main memory 204, network communication circuitry 206, a data storage device 208, and one or more I/O peripherals 210. In some alternative embodiments, the computing device 132 may include additional, fewer, and/or alternative components to those of the illustrative computing device 132, such as a graphics processing unit (GPU). It should be appreciated that one or more of the illustrative components may be combined on a single system-on-a-chip (SoC) on a single integrated circuit (IC).

Additionally, it should be appreciated that the type of components and/or hardware/software resources of the respective computing device 132 may be predicated upon the type and intended use of the respective computing device 132. For example, the call center management computing device 118 may not include any peripheral devices 210. Additionally, as described previously, the call center management computing device 118 may be comprised of more than one computing device 132. Accordingly, in such embodiments, it should be further appreciated that one or more computing devices 132 of the call center management computing device 118 may be configured as a database server with less compute capacity and more storage capacity relative to another of the computing devices 132 of the call center management computing device 118. Similarly, one or more other computing devices 132 of the call center management computing device 118 may be configured as an application server with more compute capacity relative and less storage capacity relative to another of the computing devices 132 of the call center management computing device 118.

The CPU 200, or processor, may be embodied as any combination of hardware and circuitry capable of processing data. In some embodiments, the computing device 132 may include more than one CPU 200. Depending on the embodiment, the CPU 200 may include one processing core (not shown), such as in a single-core processor architecture, or multiple processing cores, such as in a multi-core processor architecture. Irrespective of the number of processing cores and CPUs 200, the CPU 200 is capable of reading and executing program instructions. In some embodiments, the CPU 200 may include cache memory (not shown) that may be integrated directly with the CPU 200 or placed on a separate chip with a separate interconnect to the CPU 200. It should be appreciated that, in some embodiments, pipeline logic may be used to perform software and/or hardware operations (e.g., network traffic processing operations), rather than commands issued to/from the CPU 200.

The I/O controller 202, or I/O interface, may be embodied as any type of computer hardware or combination of circuitry capable of interfacing between input/output devices and the computing device 132. Illustratively, the I/O controller 202 is configured to receive input/output requests from the CPU 200, and send control signals to the respective input/output devices, thereby managing the data flow to/from the computing device 132.

The memory 204 may be embodied as any type of computer hardware or combination of circuitry capable of holding data and instructions for processing. Such memory 204 may be referred to as main or primary memory. It should be appreciated that, in some embodiments, one or more components of the computing device 132 may have direct access to memory, such that certain data may be stored via direct memory access (DMA) independently of the CPU 200.

The network communication circuitry 206 may be embodied as any type of computer hardware or combination of circuitry capable of managing network interfacing communications (e.g., messages, datagrams, packets, etc.) via wireless and/or wired communication modes. Accordingly, in some embodiments, the network communication circuitry 206 may include a network interface controller (NIC) capable of being configured to connect the computing device 132 to a computer network, as well as other devices, depending on the embodiment.

The data storage device 208 may be embodied as any type of computer hardware capable of the non-volatile storage of data (e.g., semiconductor storage media, magnetic storage media, optical storage media, etc.). Such data storage devices 208 are commonly referred to as auxiliary or secondary storage, and are typically used to store a large amount of data relative to the memory 204 described above.

Each of the I/O peripherals 210 may be embodied as any type of auxiliary device configured to connect to and communicate with the computing device 132. Depending on the embodiment, the one or more I/O peripherals 210 may include, but are not limited to those I/O peripherals commonly associated with telephone or video calls, such as, a camera 212, a display 212, a microphone 214, a speaker 216, etc. However, it should be appreciated that the I/O peripherals 210 may include additional and/or alternative I/O devices, such as, but not limited to, a mouse, a keyboard, a touchscreen, a printer, a scanner, etc. Accordingly, it should be appreciated that some I/O devices are capable of one function (i.e., input or output), or both functions (i.e., input and output).

In some embodiments, the I/O peripherals 210 may be connected to the computing device 132 via a cable (e.g., a ribbon cable, a wire, a universal serial bus (USB) cable, a high-definition multimedia interface (HDMI) cable, etc.) connected to a corresponding port (not shown) of the computing device 132 through which the communications made therebetween can be managed by the I/O controller 202. In alternative embodiments, the I/O peripherals 210 may be connected to the computing device 132 via a wireless mode of communication (e.g., Bluetooth®, Wi-Fi®, etc.) which may be managed by the network communication circuitry 206.

Referring back to FIG. 1, as noted previously, the customer computing devices 102 and the remote agent computing devices 110 are communicatively coupled to the call center 116, or more particularly to the call center management device 118, via the network 108. The network 108 may be implemented as any type of wired and/or wireless network, including a local area network (LAN), a wide area network (WAN), a global network (the Internet), etc. Accordingly, the network 108 may include one or more communicatively coupled network computing devices (not shown) for facilitating the flow and/or processing of network communication traffic via a series of wired and/or wireless interconnects. Such network computing devices may include, but are not limited, to one or more access points, routers, switches, servers, compute devices, storage devices, etc. It should be appreciated that the customer computing devices 102, the remote agent computing devices 110, and the call center management computing device 118 may use different networks (e.g., LANs, provider networks, etc.) to connect to the backbone of the network 108 such that a number of communication channels can be established therein to enable communications therebetween.

To enable the agent/customer interactions between the respective computing devices 132 over the network 110, it should be appreciated that each of the customer computing devices 102 and agent computing devices 110,126 include a respective interaction interface (not shown). Accordingly, a customer may use a customer interaction interface to interact with an agent, who in turn may use an agent interaction interface to interact with the client. The interaction interfaces may be embodied as software-based interfaces between a consumer (e.g., via a graphical user interface (GUI) for the consumer) and an agent (e.g., via a GUI for the agent), which can be managed by the call center management computing device 118. For example, the interaction interfaces may be embodied as a type of network-based software application (e.g., thin/zero client, cloud application, network application, software-as-a-service (SaaS) application, etc.) configured to communicate with the call center management computing device 118 in a client-server relationship over the network 108.

The illustrative call center management computing device 118 includes a call center management platform 120, which may be embodied as any combination of hardware, firmware, software, or circuitry usable to perform the functions described herein. In some embodiments, the call center management platform 120 may include one or more computer-readable medium (e.g., the memory 204, the data storage device 208, and/or any other media storage device) having instructions stored thereon and one or more processors (e.g., the CPU 200) coupled with the one or more computer-readable medium and configured to execute instructions to perform the functions described herein.

The illustrative call center management platform 120 includes a service queue manager 122 and an agent pool manager 124, each of which may be embodied as any type of firmware, hardware, software, circuitry, or combination thereof that is configured to perform the functions described herein. The service queue manager 122 is configured to manage the service queues for the service/support calls received at the call center 118. To do so, the service queue manager 122 is configured to create/remove service queues, identify an appropriate service queue for each call, and forward the calls from the service queues to the agents as necessary. The service queue in which the call is placed may be determined based on the type of support being requested (e.g., customer service, billing, tech support, etc.), one or more characteristics of the caller (e.g., demographic data of the caller, geographic data of the caller, caller support history, etc.), one or more characteristics of the service queue (e.g., a present volume of the service queue, a capacity of the service queue, a location of the agent(s) responsible for the service queue, etc.), etc.

The agent pool manager 124 is configured to manage the agent pools. Each of the agent pools include a variable number of agents that are actively fielding calls for one or more service queues. Accordingly, it should be appreciated that each agent pool may be associated with one or more service queues in some embodiments. Additionally, it should be further appreciated that, in some embodiments, each service queue may be associated with one or more agent pools. The agent pool manager 124 manages the agent pools by creating/destroying the agent pools and adjusting the number of agents assigned in a designated agent pool.

As such, the agent pool manager 124 is additionally configured to analyze metrics associated with the service queues (e.g., average hold times, a number of callers on hold, which types of calls are on hold, etc.) and the agent pool(s) associated therewith to determine whether to adjust the number of agents assigned to an agent pool. To do so, the agent pool manager 124 is configured to compare one or more of the service queue metrics with a corresponding threshold. For example, the agent pool manager 124 may be configured to compare a number of calls enqueued in a service queue (i.e., a call volume) with a call volume threshold (i.e., a threshold number of callers).

In another example, the agent pool manager 124 may be configured to compare an average wait time of the calls presently in the service queue against a wait time threshold (i.e., a maximum acceptable amount of time a caller should be kept on hold before speaking to an agent). In some embodiments, the threshold may be a tiered threshold, such that each threshold tier results in a predetermined number of agents that should be actively assigned to a particular service queue. Additionally or alternatively, in some embodiments, the threshold may be a dynamically adjusted threshold, such that each threshold may be predicated on more than one metric, of which one or more may be weighted.

Figure 3:
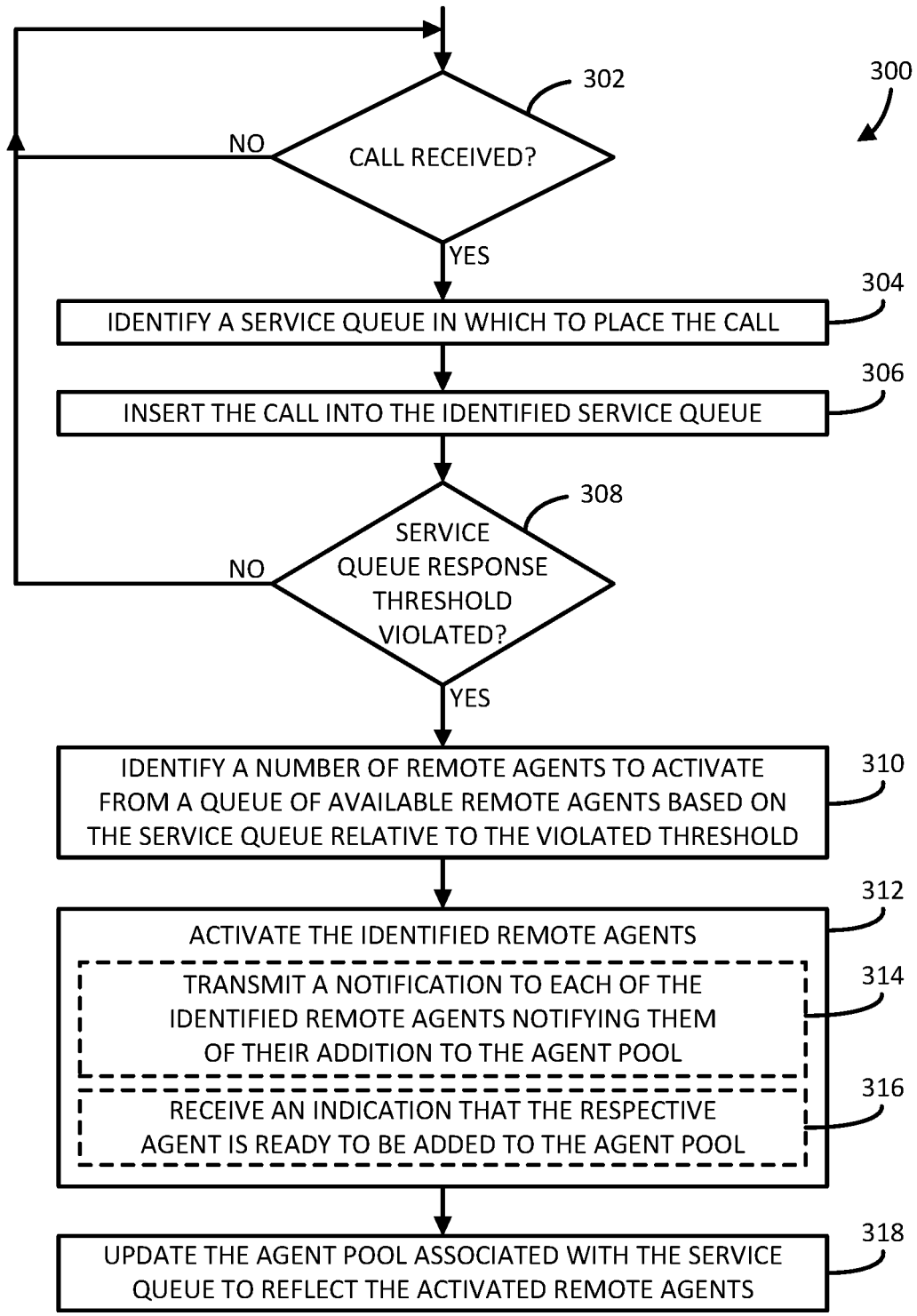
FIG. 3 is a simplified flow diagram of at least one embodiment of a method for adding a number of remote agents to an agent pool that may be executed by a call center management platform of the call center computing device of FIG. 1.

Referring now to FIG. 3, an illustrative method 300 is provided for adding a number of remote agents to an agent pool which may be executed by the call center management computing device 118, or more particularly the call center management platform 120 of the call center management computing device 118. The method 300 begins in block 302, in which the call center management platform 120 determines whether a service/support call has been received. If a call has been received, the method 300 advances to block 304 in which the call center management platform 120 identifies a service queue in which to place the call. In block 306, the call center management platform 120 inserts the call into the identified service queue.

In block 308, the call center management platform 120 determines whether a service queue response threshold has been violated. For example, the call center management platform 120 may determine whether a present call volume of a service queue exceeds a call volume threshold for that service queue. In another example, the call center management platform 120 may determine whether an average wait time of the calls presently in the service queue (i.e., an average hold time) exceeds a maximum acceptable amount of time a caller should be kept on hold before speaking to an agent (i.e., a wait time threshold). If the call center management platform 120 determines one or more service queue response thresholds has been violated, the method 300 advances to block 310; otherwise, the method 300 returns to block 302 to determine whether another call has ended.

In block 310, the call center management platform 120 identifies a number of remote agents to activate from a queue of available remote agents based on the determination as to whether one or more service queue response thresholds have been violated. In block 312, the call center management platform 120 activates the identified remote agents. To do so, in block 314, the call center management platform 120 may transmit a notification to each of the identified remote agents (e.g., to the respective remote agent computing devices 110) notifying them of their addition to the agent pool. Additionally, in block 316, the call center management platform 120 may receive an indication from the agent (e.g., via the respective remote agent computing device 110) indicating that the respective agent from which the indication was received is ready to be added to the agent pool. In block 318, the call center management platform 120 updates the agent pool associated with the service queue in which the call was inserted to reflect the activated remote agents.

Figure 4:
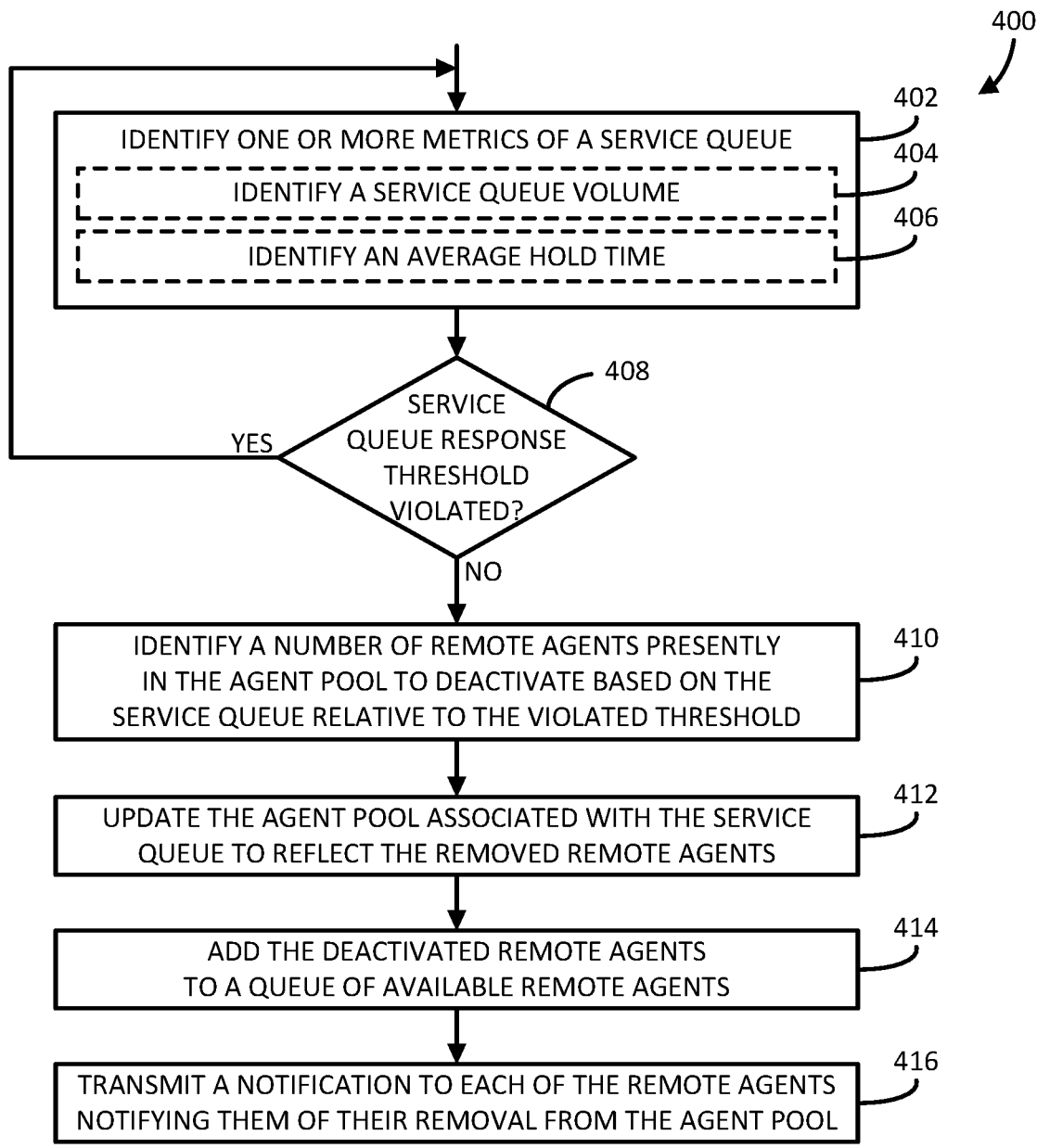
FIG. 4 is a simplified flow diagram of at least one embodiment of a method for reducing a number of remote agents from an agent pool that may be executed by a call center management platform of the call center computing device of FIG. 1.

Referring now to FIG. 4, an illustrative method 400 is provided for reducing a number of remote agents from an agent pool which may be executed by the call center management computing device 118, or more particularly the call center management platform 120 of the call center management computing device 118. The method 400 begins in block 402, in which the call center management platform 120 determines one or more metrics of a service queue. It should be appreciated that the method 400 may be initiated in response to a polling of the metrics at regular intervals, continuously, etc. For example, in block 404, the call center management platform 120 may identify a service queue volume for a particular service queue. Additionally or alternatively, in block 406, the call center management platform 120 may identify an average hold time for a particular service queue.

In block 408, the call center management platform 120 determines whether a service queue response threshold has been violated. In an illustrative example, the call center management platform 120 may determine whether the identified call volume of a service queue exceeds a call volume threshold for that service queue. In another illustrative example, the call center management platform 120 may determine whether the identified average hold time exceeds a wait time threshold. If the call center management platform 120 determines that one or more service queue response thresholds has not been violated, the method 400 advances to block 410; otherwise, the method 400 returns to block 402 to determine whether another call has ended.

In block 410, the call center management platform 120 identifies a number of remote agents presently in the agent pool to deactivate based on the determination as to whether one or more service queue response thresholds have been violated. In block 412, the call center management platform 120 updates the agent pool associated with the service queue to reflect the removed remote agents. In block 414, the call center management platform 120 adds the deactivated remote agents to the queue of available remote agents such that they can be reactivated as demand requires.

In block 416, the call center management platform 120 transmits a notification to each of the identified remote agents (e.g., to their respective remote agent computing devices 110) notifying them of their removal from the agent pool. It should be appreciated that the identified remote agents may not be immediately notified (i.e., the transmission may be delayed). For example, a remotely operating agent may be on a call assisting a customer at the time they have been removed from the agent pool. Under such conditions, the notification may be transmitted upon that call having ended.

It should be appreciated that, in some embodiments, the method 400 may be triggered upon other triggering events, such as additional and/or alternative metrics being monitored (e.g., at regular intervals, continuously, etc.), a service/support call exiting the queue (e.g., the call being transferred to an agent, the customer hanging up, etc.), a service/support call having ended, etc. Additionally, while the method 300 for adding remote agents to an agent pool has been described herein as being triggered by receiving a service/support call, it should be appreciated that the method 300 may be triggered as a function of identified metrics as described in the method 400. In other words, the call center management platform 120 may be configured to add remote agents to the agent pool as described in blocks 310-318 in response to the determination in block 408 of the method 400 that one or more service queue response threshold(s) has been violated.

While the present disclosure has been illustrated and described in detail in the drawings and foregoing description, the same is to be considered as illustrative and not restrictive in character, it being understood that only certain embodiments have been shown and described, and that all changes and modifications that come within the spirit of the present disclosure are desired to be protected.

What is claimed is:

1. A method for scaling call center support staff, the method comprising:
   receiving, by a call center management computing device, a service call;
   inserting, by the call center management computing device, the service call into a service queue;
   determining, by the call center management computing device, a service queue response threshold;
   in response to inserting the service call into the service queue, determining, by the call center management computing device, the service queue response threshold associated with the service queue has been violated as a function of the service call having been inserted into the service queue and a status of an agent pool, wherein the agent pool corresponds to:
  a plurality of local agent devices operated by respective agents designated as local agents that are located locally with respect to a contact center; and
  a plurality of remote agent devices operated by respective first remote agents designated as remote agents that are located remote with respect to the contact center;
identifying, by the call center management computing device and in response to determining the service queue response threshold associated with the service queue has been violated, one or more second remote agents from a queue of available remote agents; and
adding, by the call center management computing device, a predetermined number of the identified one or more second remote agents to the agent pool associated with the service queue, based on a violation of the service queue response threshold corresponding to a threshold tier corresponding to the predetermined number.

2. The method of claim 1, wherein determining whether the service queue response threshold associated with the service queue has been violated comprises determining whether a present call volume of the service queue exceeds a call volume threshold of the service queue.

3. The method of claim 1, wherein determining whether the service queue response threshold associated with the service queue has been violated comprises determining whether an average hold time of service calls in the service queue exceeds a wait time threshold.

4. The method of claim 1, wherein adding the identified one or more remote agents to the agent pool comprises:
  transmitting a notification to each of the identified one or more remote agents, wherein the notification identifies to the respective identified one or more remote agents the adding to the agent pool;
  receiving an indication from each of the identified one or more remote agents that indicates the corresponding remote agent is ready to be added to the agent pool; and
  inserting, upon receiving the respective indication, the associated identified one or more remote agents into the agent pool associated with the service queue.

5. The method of claim 1, further comprising:
identifying, by the call center management computing device, one or more metrics of the service queue;
comparing, by the call center management computing device, the identified one or more metrics of the service queue to a corresponding service queue response threshold associated with the service queue;
determining, by the call center management computing device, whether the service queue response threshold associated with the service queue has been violated as a function of the comparison;
identifying, by the call center management computing device and in response to a determination that at least one service queue response threshold associated with the service queue has been violated, one or more remote agents to remove from the agent pool; and
removing, by the call center management computing device, the identified one or more remote agents from the agent pool.

6. The method of claim 5, further comprising adding, by the call center management computing device, deactivated remote agents to the queue of available remote agents.

7. The method of claim 5, further comprising transmitting, by the call center management computing device, a removal notification to each of the deactivated remote agents notifying each of a plurality of deactivated remote agents of removal from the agent pool.

8. An interaction management computing device for scaling call center support staff, the interaction management computing device comprising:
  one or more computer-readable medium comprising instructions; and
  one or more processors coupled with the one or more computer-readable medium and configured to execute the instructions to:
  receive a service call;
  insert the service call into a service queue;
  determine a service queue response threshold;
  in response to inserting the service call into the service queue, determine the service queue response threshold associated with the service queue has been violated as a function of the service call having been inserted into the service queue and a status of an agent pool, wherein the agent pool corresponds to:
    a plurality of local agent devices operated by respective agents designated as local agents that are located locally with respect to a contact center; and
    a plurality of remote agent devices operated by respective first remote agents designated as remote agents that are located remote with respect to the contact center;
  identify, in response to determining the service queue response threshold associated with the service queue has been violated, one or more second remote agents from a queue of available ones of the respective remote agents; and
  add a predetermined number of the identified one or more second remote agents to the agent pool associated with the service queue, based on a violation of the service queue response threshold corresponding to a threshold tier corresponding to the predetermined number.

9. The interaction management computing device of claim 8, wherein to determine whether the service queue response threshold associated with the service queue has been violated comprises to determine whether a present call volume of the service queue exceeds a call volume threshold of the service queue.

10. The interaction management computing device of claim 8, wherein to determine whether the service queue response threshold associated with the service queue has been violated comprises to determine whether an average hold time of service calls in the service queue exceeds a wait time threshold.

11. The interaction management computing device of claim 8, wherein adding the identified one or more remote agents to the agent pool comprises to:
  transmit a notification to each of the identified one or more remote agents, wherein the notification identifies to the respective identified one or more remote agents the addition to the agent pool;
  receive an indication from each of the identified one or more remote agents that indicates the corresponding remote agent is ready to be added to the agent pool; and
  insert, upon having received the respective indication, the associated identified one or more remote agents into the agent pool associated with the service queue.

12. The interaction management computing device of claim 8, wherein the one or more processors are further configured to execute the instructions to:
  identify one or more metrics of the service queue;

compare the identified one or more metrics of the service queue to a corresponding service queue response threshold associated with the service queue;

determine whether the service queue response threshold associated with the service queue has been violated as a function of the comparison;

identify, in response to a determination that at least one service queue response threshold associated with the service queue has been violated, one or more remote agents to remove from the agent pool; and remove the identified one or more remote agents from the agent pool.

13. The interaction management computing device of claim 12, wherein the one or more processors are further configured to execute the instructions to add deactivated remote agents to the queue of available remote agents.

14. The interaction management computing device of claim 12, wherein the one or more processors are further configured to execute the instructions to transmit a removal notification to each of a plurality of deactivated remote agents notifying each of the deactivated remote agents of removal from the agent pool.

* * * * *